(12) United States Patent
Finchelstein et al.

(10) Patent No.: US 11,693,793 B2
(45) Date of Patent: Jul. 4, 2023

(54) METHOD OF SECURE COMMUNICATION AMONG PROTECTED CONTAINERS AND SYSTEM THEREOF

(71) Applicant: KAZUAR ADVANCED TECHNOLOGIES LTD., Tel-Aviv (IL)

(72) Inventors: Daniel Mondy Finchelstein, Rishon Lezion (IL); Yuval Moshe Porat, Tel Aviv-Jaffa (IL); Erez Gal-Betzer, Rehovot (IL); Yaacov Fenster, Petach Tikvah (IL)

(73) Assignee: KAZUAR ADVANCED TECHNOLOGIES LTD., Tel-Aviv (IL)

( * ) Notice: Subject to any disclaimer, the term of this patent is extended or adjusted under 35 U.S.C. 154(b) by 0 days.

(21) Appl. No.: 17/041,146

(22) PCT Filed: Mar. 26, 2019

(86) PCT No.: PCT/IL2019/050351
§ 371 (c)(1),
(2) Date: Sep. 24, 2020

(87) PCT Pub. No.: WO2019/186554
PCT Pub. Date: Oct. 3, 2019

(65) Prior Publication Data
US 2021/0026784 A1 Jan. 28, 2021

(30) Foreign Application Priority Data
Mar. 26, 2018 (IL) .......................... 258380

(51) Int. Cl.
*G06F 12/14* (2006.01)
*H04L 9/08* (2006.01)

(52) U.S. Cl.
CPC ........ *G06F 12/1408* (2013.01); *H04L 9/0833* (2013.01); *H04L 9/0861* (2013.01); *H04L 9/0894* (2013.01)

(58) Field of Classification Search
CPC . G06F 12/1408; H04L 9/0833; H04L 9/0861; H04L 9/0894
(Continued)

(56) References Cited

U.S. PATENT DOCUMENTS

2008/0046763 A1 2/2008 Fujimoto et al.
2012/0173885 A1 7/2012 Acar et al.
(Continued)

OTHER PUBLICATIONS

Intel Software Guard Extensions, Developer Guide. Sep. 2016.
(Continued)

*Primary Examiner* — Kambiz Zand
*Assistant Examiner* — Phuc Pham
(74) *Attorney, Agent, or Firm* — Browdy and Neimark, P.L.L.C.

(57) ABSTRACT

There is provided a method of communication among at least two processes miming on the same computer. The method comprises: generating, by at least one process of the at least two processes, a group key usable for encrypting/decrypting a data unit retrieved from/stored to shared access memory, wherein the generating utilizes, at least, a nonce provided by each of the at least two processes, and wherein the nonces are provided as encrypted integrity-protected data according to, at least, a platform-provided hiding function, wherein each process executes in a protected container, the processes are signed by a single signing authority, and the protected container infrastructure enables use of encrypted, integrity-protected data according to a platform-provided hiding function and a platform-provided revealing function; and verifying, by at least one process of the at least (Continued)

two processes, that a data unit read from shared access memory is successfully decrypted using the group key.

8 Claims, 4 Drawing Sheets

(58) Field of Classification Search
USPC .......................................................... 713/193
See application file for complete search history.

(56) References Cited

U.S. PATENT DOCUMENTS

| | | | |
|---|---|---|---|
| 2013/0232344 A1* | 9/2013 | Johnson | G06F 21/645 |
| | | | 713/193 |
| 2016/0065362 A1* | 3/2016 | Choyi | H04L 9/0847 |
| | | | 380/279 |
| 2017/0171169 A1* | 6/2017 | Lee | H04L 9/12 |

OTHER PUBLICATIONS

Kim, et a., Secure Group Key Management for Storage Area Networks, IEEE Communications Magazine, Aug. 2003, pp. 92-99, 41(8).

* cited by examiner

METHOD OF SECURE COMMUNICATION AMONG PROTECTED CONTAINERS AND SYSTEM THEREOF

TECHNICAL FIELD

The presently disclosed subject matter relates to trusted computing environments and, more particularly, to establishing secure communication among distinct trusted computing environments.

BACKGROUND

Problems of protection against malware have been recognized in the conventional art and various techniques have been developed to provide solutions.

GENERAL DESCRIPTION

According to one aspect of the presently disclosed subject matter there is provided a method of communication among at least two processes running on the same computer, the method comprising:
  generating, by at least one process of the at least two processes, a group key usable for encrypting a data unit to be stored in shared access memory and usable for decrypting a data unit retrieved from shared access memory, wherein the generating utilizes, at least, a nonce provided by each of the at least two processes, and wherein the nonces are provided as encrypted integrity-protected data according to, at least, a platform-provided hiding function,
    wherein each process executes in a protected container comprised in a protected container infrastructure, the processes are signed by a single signing authority, and the protected container infrastructure enables use of encrypted, integrity-protected data according to a platform-provided hiding function and a platform-provided revealing function; and
  verifying, by at least one process of the at least two processes, that a data unit read from the shared access memory is successfully decrypted using the group key.

In addition to the above features, the system according to this aspect of the presently disclosed subject matter can comprise one or more of features (i) to (v) listed below, in any desired combination or permutation which is technically possible:
(i). generating a group key is performed by each of the at least two processes.
(ii). generating a group key is according to a method comprising:
  generating a nonce;
  creating encrypted, integrity-protected data according to the nonce and the platform-provided hiding function;
  storing the encrypted, integrity-protected data to a location in a shared access memory;
  retrieving, at least, nonces stored by each of the at least two processes excepting itself, wherein the nonces are retrieved according to data read from locations in shared access memory and the platform-provided revealing function; and
  generating a group key, according to a key generation function the retrieved nonces and the nonce generated by the process.
(iii) wherein a first process of the at least 2 processes excludes nonces stored by a second process according to whether a frequency of group key rollover initiated by the second process meets group key rollover frequency threshold.
(iv) the key generation function is a cryptographic hash function.
(v) the key generation function is a sampling function.

According to another aspect of the presently disclosed subject matter there is provided a computer, comprising a memory and a processor, configured to execute at least two processes, the computer configured to:
  generate, by at least one process of the at least two processes, a group key usable for encrypting a data unit to be stored in shared access memory and usable for decrypting a data unit retrieved from shared access memory, wherein the generating utilizes, at least, a nonce provided by each of the at least two processes, and wherein the nonces are provided as encrypted integrity-protected data according to, at least, a platform-provided hiding function,
    wherein each process is configured to execute in a protected container comprised in a protected container infrastructure, the processes configured to be signed by a single signing authority, and the protected container infrastructure configured for use of encrypted, integrity-protected data according to a platform-provided hiding function and a platform-provided revealing function; and
  verify, by at least one process of the at least two processes, that a data unit read from the shared access memory is successfully decrypted using the group key.

According to another aspect of the presently disclosed subject matter there is provided a computer program product comprising a computer readable storage medium, containing program instructions, which programs instructions when read by a processor, and causes the processor to perform a method of communication among at least two processes running on the same computer, the method comprising:
  generating, by at least one process of the at least two processes, a group key usable for encrypting a data unit to be stored in shared access memory and usable for decrypting a data unit retrieved from shared access memory, wherein the generating utilizes, at least, a nonce provided by each of the at least two processes, and wherein the nonces are provided as encrypted integrity-protected data according to, at least, a platform-provided hiding function,
    wherein each process executes in a protected container comprised in a protected container infrastructure, the processes are signed by a single signing authority, and the protected container infrastructure enables use of encrypted, integrity-protected data according to a platform-provided hiding function and a platform-provided revealing function; and
  verifying, by at least one process of the at least two processes, that a data unit read from the shared access memory is successfully decrypted using the group key.

Advantages of certain embodiments of the presently disclosed subject matter include capability of private, integrity protected communication among trusted computing environments in a system potentially including harmful elements, and absence of necessity of public-key or preshared key operations.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "verifying", "establishing", "updating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, processing and memory circuitry therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
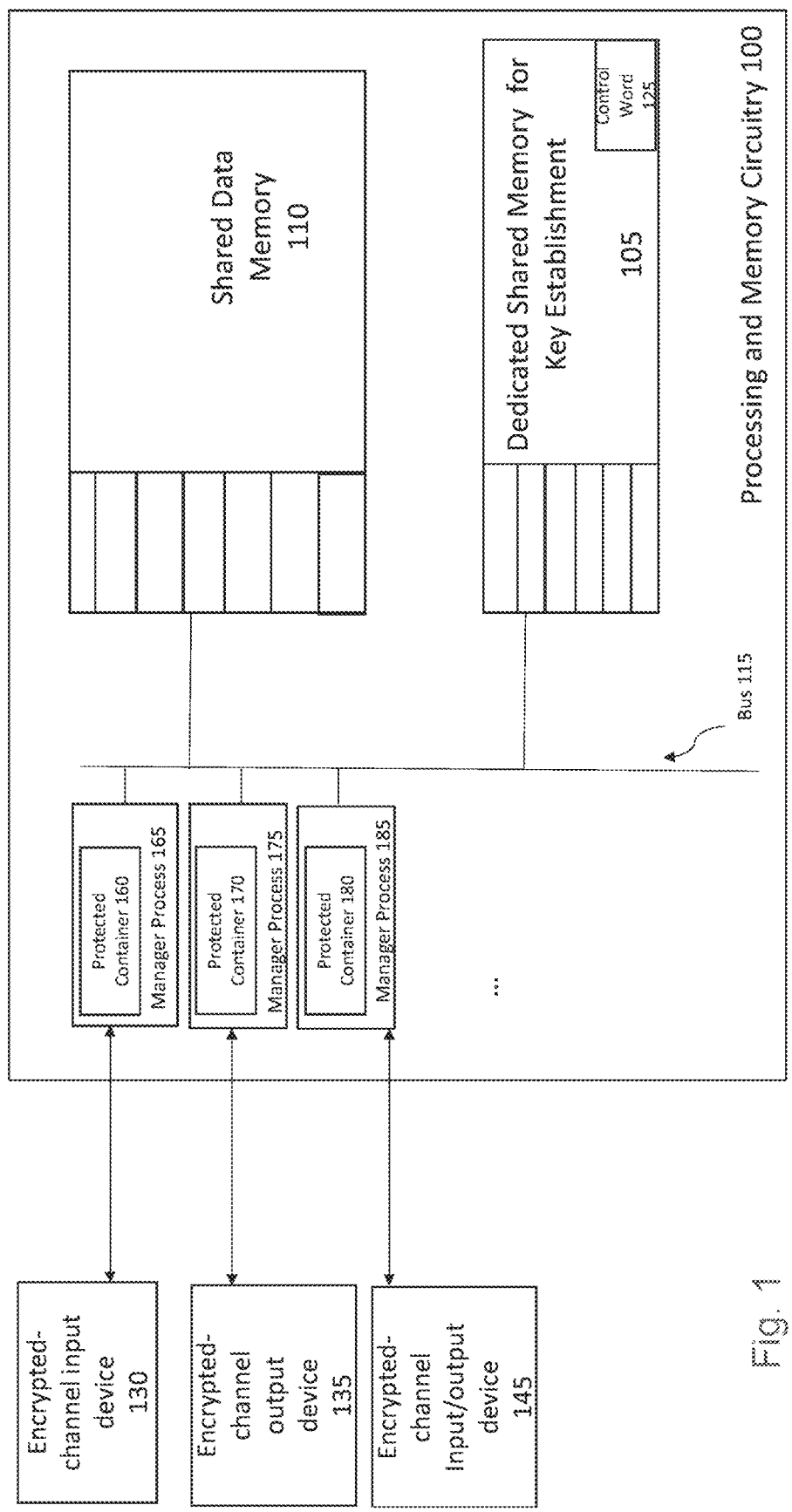
FIG. 1 illustrates a diagram of an exemplary computer system which can utilize a multiparty communication mechanism in accordance with some embodiments of the presently disclosed subject matter.

Bearing this in mind, attention is drawn to FIG. 1 illustrating a diagram of an exemplary computer system which can utilize a multiparty communication mechanism in accordance with some embodiments of the presently disclosed subject matter. The illustrated computer system comprises processing and memory circuitry 100 comprising a processor and a memory (not shown separately within the processing and memory circuitry 100).

As will be further detailed with reference to FIGS. 3-4, the processing and memory circuitry 100 can be configured to execute several functional modules in accordance with computer-readable instructions implemented on a non-transitory computer-readable storage medium. Such functional modules are referred to hereinafter as comprised in the processing and memory circuitry 100.

The processing and memory circuitry 100 can comprise a bus 115 usable for communication among components of the processing and memory circuitry 100. The bus 115 can be, for example, a PCI bus or any other suitable communication mechanism.

The processing and memory circuitry 100 can comprise, for example, one or more protected containers 160, 170, 180. A protected container can be, for example, a software container configured so that access control mechanisms (for example: hardware-enforced access control mechanisms) protect the code, data, and stack of the software container from reading or modification by elements outside the container (such as, for example, non-container software running with high-privilege or low privilege, software running in other containers, logic probes attached to the processing and memory circuitry 100 etc.). The protected containers can be operably connected to a protected container infrastructure (not shown), which can be, for example, hardware and software comprised in the processing and memory circuitry 100 for supporting the protected container functionality.

In some embodiments of the present subject matter, a protected container can be an enclave managed by the Software Guard Extensions (SGX) technology supported in some processors manufactured by the Intel™ Corporation or a similar mechanism. In such embodiments, the protected container infrastructure can be, for example, the hardware, firmware and software supporting the Intel™ SGX™ facility, or a similar mechanism.

The processing and memory circuitry 100 can comprise shared data memory 110 (shared access memory). The shared data memory 110 can be, for example, a dedicated physical memory component (such as a chip) or it can be, for example, a logical region of a larger memory.

Shared data memory 110 can be configured to be accessed by multiple protected containers. In some embodiments of the presently disclosed subject matter, protected container data is typically private by default, so the shared data memory 110 can be explicitly configured for read/write access by multiple protected containers as described below with reference to FIG. 3.

The shared data memory 110 can be configured to be used, for example, for encrypted communication among processes utilizing protected containers—as will be described in detail below with reference to FIG. 2.

The processing and memory circuitry 100 can comprise dedicated shared memory for key establishment 105. The dedicated shared memory for key establishment 105 can be, for example, a dedicated physical memory component (such as a chip) or it can be, for example, a logical region of a larger memory.

Dedicated shared memory for key establishment 105 can be configured to be accessed by multiple protected containers. In some embodiments of the presently disclosed subject matter, protected container data is typically private by default, so the dedicated shared memory for key establishment 105 can be explicitly configured for read/write access by multiple protected containers as described below with reference to FIG. 3. Dedicated shared memory for key establishment 105 can include a control word 125. The control word 125 can be configured to be used by a process utilizing a protected container to send commands or requests to a peer process—as will be described below with reference to FIG. 4.

In some embodiments of the presently disclosed subject matter, software processes utilizing protected containers can be configured to store keying material (in a secure, encrypted format) into the dedicated shared memory for key establishment 105 and to retrieve and utilize the keying material to derive a composite key for group communication (group key) with certain security properties—as will be described below with reference to FIG. 4. An encryption/decryption key for communication between members of a group is hereforward termed a "group key".

There can be, for example, several peripheral devices operatively connected to the processing and memory circuitry 100, including, by way of non-limiting example, encrypted channel input device 130, encrypted channel output device 135, and encrypted channel output device 145.

The encrypted channel input device 130 can be, for example, a computer keyboard configured to generate encrypted output in response to user keystrokes, and transmit this encrypted keystroke data to the processing and memory circuitry 100. Such a keyboard can be resistant to monitoring by keylogging software in a computer or to a hardware keylogger that monitors signals in the physical keyboard or cable.

The encrypted channel output device 135 can be, for example, a display device configured to receive encrypted display data from the processing and memory circuitry 100. Such a display can be resistant to side channel attacks such as devices which perform electromagnetic radiation monitoring to detect display data.

The encrypted channel input/output device 145 can be, for example, a remotely located Remote Desktop Protocol (RDP) server configured to exchange data with the processing and memory circuitry 100 via, for example, the internet, and using, for example, a mechanism such as the Secure Socket Layer (SSL) protocol over a network adapter (not shown) included in the processing and memory circuitry 100.

The processing and memory circuitry 100 can comprise, for example, one or more manager processes 165, 175, 185. By way of non-limiting examples: manager process 165 can be configured to receive encrypted data from encrypted-channel input device 130; manager process 175 can be configured to transmit encrypted data to encrypted-channel output device 135; manager process 185 can be configured to transmit and receive encrypted data to/from encrypted-channel input/output device 145. Manager processes 165, 175, 185 can also, for example, read encrypted data from shared data memory 110 and write encrypted data to shared data memory 110.

Manager processes 165, 175, and 185 can be configured to utilize protected containers 160, 170, and 180 for decryption and other sensitive processing. For example, protected container 160 can be configured to perform the decryption of data from encrypted-channel input device 130 and encrypt the data for storage to shared data memory 110; protected container 170 can be configured to perform the decryption of data read from shared data memory 110 and encrypt the data for transmission to encrypted-channel output device 135; protected container 170 can be configured to perform the decryption of data from encrypted-channel input/output device 145 and encrypt the data for storage to shared data memory 110, and to perform the decryption of data read from shared data memory 110 and encrypt the data for transmission to encrypted-channel input/output device 145. In these cases, any keys for encrypting/decrypting data to/from peripheral devices as well as shared data memory 110 can be maintained, for example, within the respective protected containers.

In some embodiments of the presently disclosed subject matter, the manager processes 165, 175, and 185 can be configured to perform device I/O operations outside of the protected containers 160, 170, and 180, while performing encryption/decryption operations within the protected containers 160, 170, and 180.

It is noted that the teachings of the presently disclosed subject matter are not bound by the computer system described with reference to FIG. 1. Equivalent and/or modified functionality can be consolidated or divided in another manner and can be implemented in any appropriate combination of software with firmware and/or hardware and executed on a suitable device. The computer system can be a standalone network entity, or integrated, fully or partly, with other network entities. Those skilled in the art will also readily appreciate that the data repositories can be consolidated or divided in other manner databases can be shared with other systems or be provided by other systems, including third party equipment.

Figure 2:
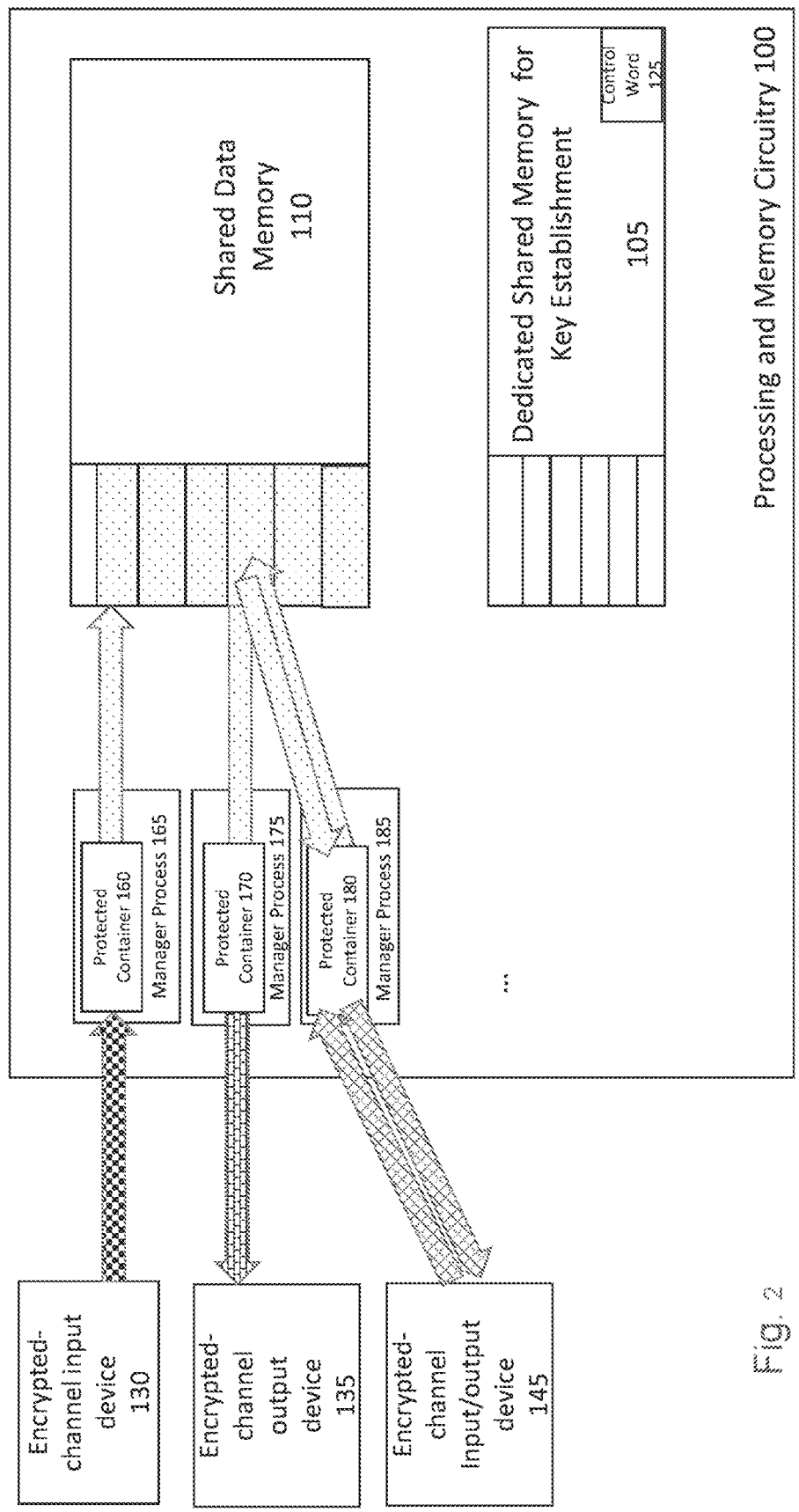
FIG. 2 illustrates exemplary data flows during operation of the computer system, in accordance with some embodiments of the presently disclosed subject matter.

Attention is now directed to FIG. 2, which illustrates exemplary data flows during operation of the computer system, in accordance with some embodiments of the presently disclosed subject matter.

Arrows illustrate example data flows within the system. The hatching pattern of an arrow illustrates, by way of non-limiting example, that a data flow is encrypted according to a specific encryption/decryption key. Thus data that is stored in shared data memory 110 is, for example, in encrypted format according to a group encryption/decryption key (for example: generated according to the mechanism described below with reference to FIG. 4). The data that is read from/written to shared data memory 110 by manager processes 165, 175, and 185 is, for example, encrypted according to the same key.

FIG. 2 shows that the data flows between manager processes 165, 175, and 185 and encrypted-channel input device 130, encrypted-channel output device 135, and encrypted-channel input/output device 145 utilize distinct keys. This illustrates, by way of non-limiting example, a system where the secure multiparty communication mechanism is used to provide intrasystem security—so that sensitive data is not compromised even if there is malware in entrusted parts of the system.

Figure 3:
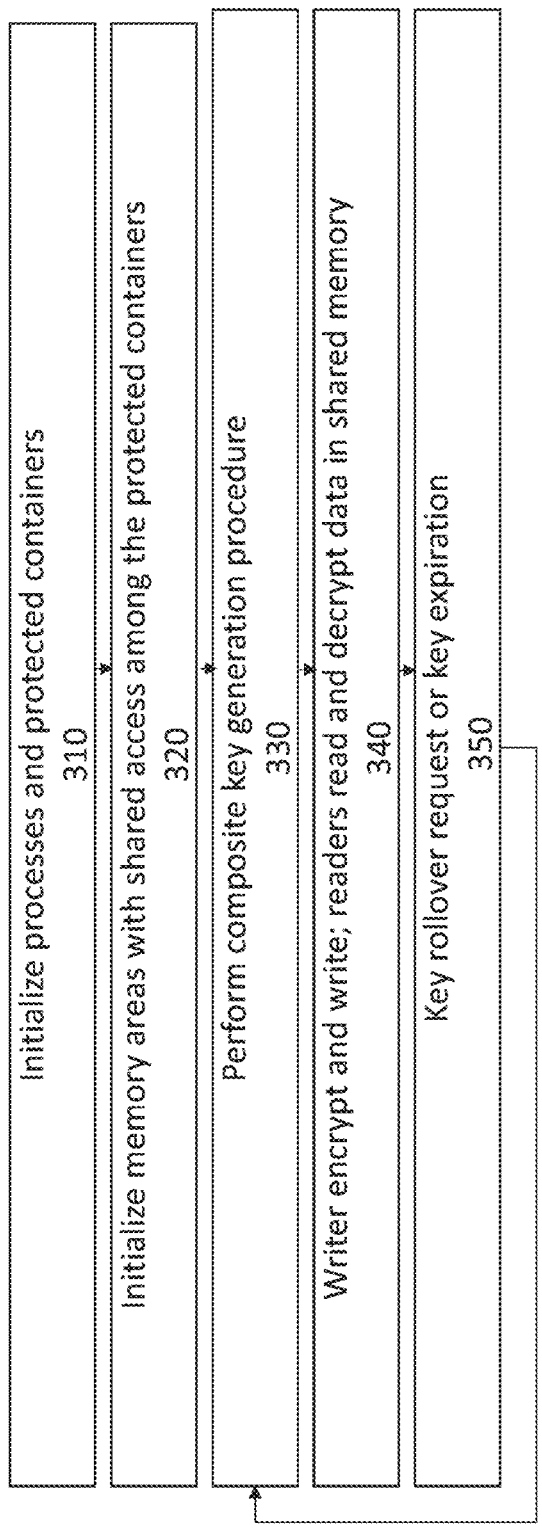
FIG. 3, illustrates a generalized flow diagram describing the establishment and use of the multiparty secure communication subsystem, in accordance with some embodiments of the presently disclosed subject matter.

Attention is now directed to FIG. 3, which illustrates a generalized flow diagram describing the establishment and use of the multiparty secure communication subsystem, in accordance with some embodiments of the presently disclosed subject matter.

Following, for example, system initialization or system refresh, manager processes 165, 175, 185 (for example) running within the processing and memory block 100 can initialize 310 a group of protected containers within the processing and memory circuitry 100.

The technique for initializing protected containers can depend on the type of protected containers being used in the system. The initialization can include, for example, allocating memory to the containers, providing software to be executed inside the containers, and providing certificates or signatures which provide cryptographic assurance that the provided software is authentic. The entity (such as the software publisher), which provides cryptographic assurance of the authenticity of a particular software to be executed within a protected container is hereforward referred to as a "signing authority".

In embodiments where protected containers similar to Intel™ SGX™ enclaves are utilized, the initialization procedure can include invocation of processor instructions for allocating memory and loading software (together with the cryptographic certificate signed by the software vendor) into the enclave. Runtime processes can execute in a signed and verified enclave. The enclave can be tested by the platform (e.g. SGX) and by (for example) the system vendor as signed code when it's run.

Subsequent to initialization of the protected containers (or in some embodiments, as part of the initialization of the protected containers) the processing and memory circuitry 100 (for example: manager processes 165, 175, 185), can allocate and initialize (320) memory areas that will be accessed by multiple protected containers (shared access memory). These memory areas can include, for example, shared data memory 110 and dedicated shared memory for key establishment 105. The shared data memory 110 and dedicated shared memory for key establishment 105 can be allocated, for example, as regions in general purpose memory of the processing and memory circuitry 100. In some embodiments of the current subject matter, the initialization can include configuring the protected containers 160, 170, 180 so that the access protection facility will allow reads/writes from/to the shared data memory 110 and dedicated shared memory for key establishment 105 even though these memories are not private to the container. Consequently, the software processes utilizing the protected containers should, for example, ensure that unencrypted data is never written to these memories.

Following the initialization of the protected containers and of the shared memory areas, a composite key establishment procedure can be performed 330. This procedure is described in detail below, with reference to FIG. 4.

After a composite key has been established, software processes utilizing protected containers can communicate with each other by writing to and reading from shared data area 110 using the composite key. By way of non-limiting example, a process that writes data can encrypt (340) the data using the composite key and write (340) the data to the shared data area 110, using, for example, a ring buffer. A process that reads data can then read (340) data from the ring buffer and decrypt (340) the data using the composite key.

The encryption and decryption can be performed using, for example, a known encryption and integrity protection algorithm such as the Advanced Encryption Standard (AES) block cipher with, for example, 1.28-bit block size and 128-bit key size using, for example, Xor-encrypt-xor Tweakable Block Cipher with Ciphertext Stealing (XTS) as described in NIST Special Publication 800-38E. Alternatively, a different suitable cipher, mode, block size, or key size can be used. The encryption/decryption can, for example, use a replay protection mechanism such as including monotonically increasing counters together with the data payload.

Upon occurrence of an event necessitating key rollover (350), the composite key establishment procedure (330) can be performed again and a resulting new composite key can be used thereafter. There are various occurrences which can constitute an event necessitating key rollover. By way of non-limiting example, the system can enforce an age limit on the composite key and require it to be refreshed, for example, once per 12 hour period. Alternatively, by way of non-limiting example, a process can initialize a new protected container which can signal to a coordinator process (described below) that it wishes to participate in the group communication—this can trigger a key rollover.

It is noted that in some embodiments there can be a possibility that one of the processes is malicious and intentionally causing unnecessary rollovers.
Consequently:
To protect from a malicious non-coordinator process, the coordinator process can monitor the rate of rollovers and exclude a process that generates excessive rollovers.
To protect from a malicious coordinator process, the non-coordinator processes can monitor the rate of rollovers caused by the coordinator process, and then (as a group) exclude the coordinator process if it generating excessive rollovers. More generally: a process can protect against malicious unnecessary rollovers by excluding notices that were stored by a different process which is initiating group key rollovers (requiring key regeneration) at a frequency that meets or exceeds some (for example) predetermined group key rollover frequency threshold.

It is noted that the teachings of the presently disclosed subject matter are not bound by the flow chart illustrated in FIG. 3, and that the illustrated operations can occur out of the illustrated order. For example, operations 310 and 320 shown in succession can be executed substantially concurrently or in the reverse order. It is also noted that whilst the flow chart is described with reference to elements of FIG. 1, this is by no means binding, and the operations can be performed by elements other than those described herein.

Figure 4:
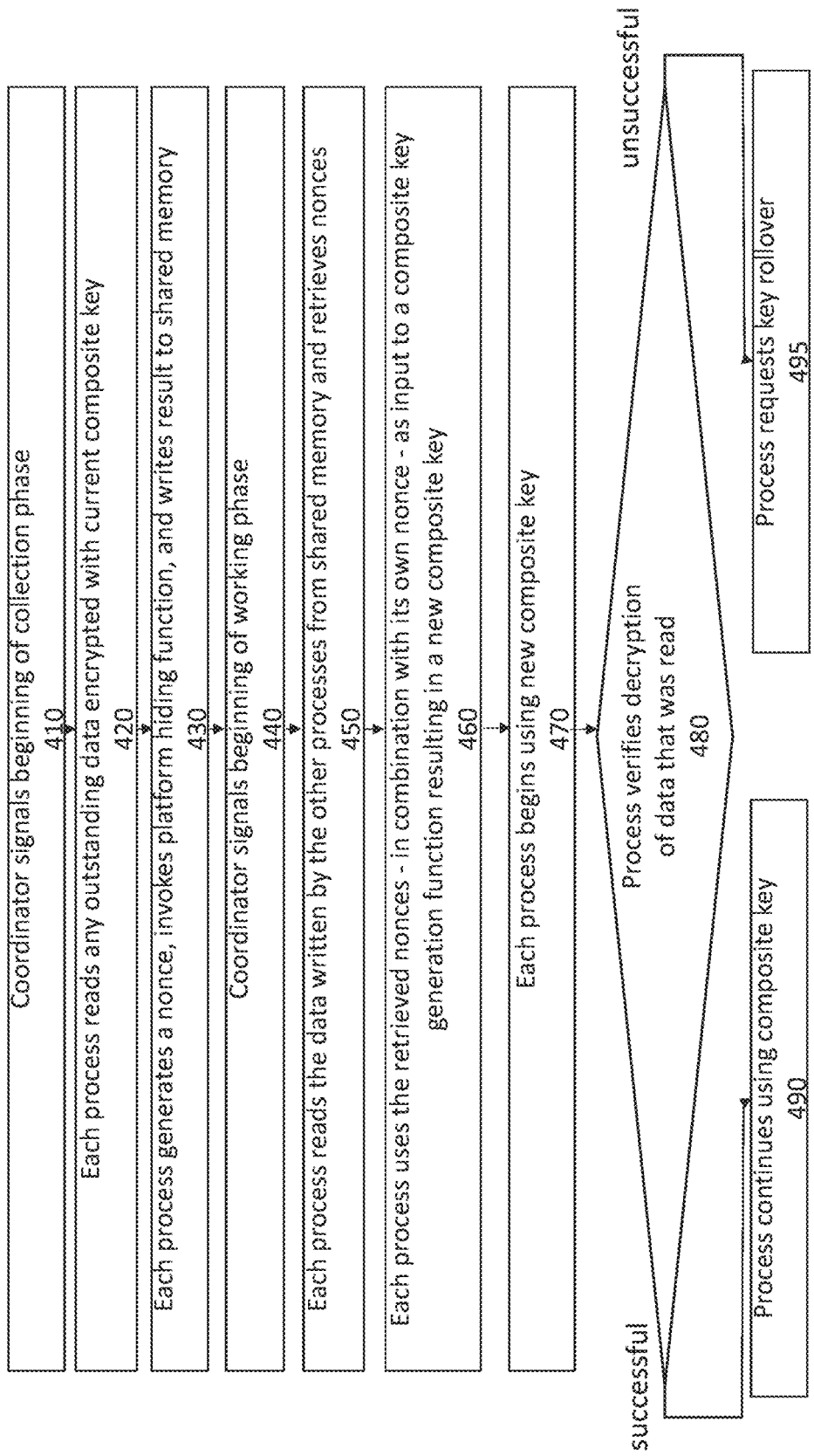
FIG. 4 illustrates a generalized flow diagram describing the composite key establishment procedure, in accordance with some embodiments of the presently disclosed subject matter.

Attention is now directed to FIG. 4, which illustrates a generalized flow diagram describing the composite key establishment procedure, in accordance with some embodiments of the presently disclosed subject matter.

The flow diagram refers to a "coordinator process". A coordinator process can be, for example, a process utilizing a protected container which orchestrates the key establishment procedure with the other processes (as will be seen below). In some embodiments of the present subject matter, the processes in the system can consist, for example, of a single writer and multiple reader processes. In such embodiments, the writer process can perform the role of the coordinator process.

In some embodiments of the presently disclosed subject matter, the protected container infrastructure can provide platform-provided secrecy functions to processes. The platform-provided secrecy functions can include, for example, a platform-provided hiding function and a platform-provided revealing function.

A platform-provided hiding function can, for example, convert a data item into a format that is safe from reading or modification by an unauthorized entity (i.e. it is encrypted and integrity-protected). A platform-provided revealing function can, for example, receive a data item generated by the corresponding platform-provided hiding function and return the original data item. In some embodiments of the presently disclosed subject matter, the platform-provided revealing function will return the original data item only in a circumstance where a) the process invoking it is utilizing the same protected platform infrastructure instance as the process that previously invoked the platform-provided hiding function, b) the two processes are signed by the same signing authority—and indicate failure otherwise.

In embodiments where protected containers similar to Intel™ SGX™ enclaves are utilized, the "sealing function" using the MRSIGNER option can be the platform-provided hiding function and the "unsealing function" using the MRSIGNER option can be the platform-provided revealing function. The seating and unsealing functions are described, by way of non-limiting example in https://download.01.org/intel-sgx/linux-1.7/docs/Intel_SGX_Developer_Guide.pdf.

When a process in an enclave "seals" data in this manner, only a process in an enclave that is executing on the same SGX hardware platform and is signed by the same signing authority, is able to unseal the data i.e. to recover it.

The sealing/unsealing mechanism can be used by processes to, for example, store data on the hardware platform that can be retained across upgrades of the software process executing in the container (ibid. pp. 21-24).

In some embodiments of the present subject matter, it is possible to leverage the platform-provided secrecy functions not merely for data secrecy, but additionally to establish trust and security among the processes. By sending data resulting from the platform-provided hiding function (e.g. "sealing") to other processes and utilizing the results of the platform-provided revealing function (e.g. "unsealing") to generate the composite key (as will be described in detail below), it can subsequently be inferred (upon successful use of the composite key) that all processes performed the revealing function successfully and thus that all processes were confirmed by the hardware platform as authentic, secure, and unmodified.

The composite key establishment procedure can begin, for example, when a coordinator process signals (410) to the other processes to begin the collection phase. The term "collection phase" refers to the interval of system operation in which processes can collect the data that they need to a generate a new composite key. The coordinator process can signal the beginning of the collection phase by, for example, providing a particular value as input to the platform-provided hiding function and writing the resulting value to a particular location (for example, to the control word) in the dedicated shared memory for key establishment 105. The other (i.e. non-coordinator) processes can continually monitor the control word so that they can correctly move between phases.

In some embodiments of the presently disclosed subject matter, a coordinator process can refrain from writing new encrypted data during the collection phase.

In some embodiments of the presently disclosed subject matter, after detecting the signal from the coordinator (by, for example, reading the control word and retrieving the value written by the coordinator using the platform-provided hiding function), a process can, for example, read (420) and decrypt any outstanding data that was written to the shared data memory 110 using the current composite key.

Next, each process can, for example, generate (430) a nonce, provide the nonce as input to the platform-provided hiding function (430), and then write (430) the resulting value into the dedicated shared memory for key establishment 105. A process can generate a nonce from, for example, a hardware or software random number generator available in its execution environment.

The nonce utilized by a process can be—for example—a pseudorandomly (or randomly) generated value for one-time use in key generation (such a value generated using a hardware or software pseudorandom number generator). Alternatively, the nonce can be a different value (such as a pre-existing value) which is suitable for use in derivation of cryptographic keys.

The process can write the value resulting from the platform-provided hiding function to, for example, a location in the dedicated shared memory for key establishment 105 that is exclusively used for reading/writing nonce contributions from the particular process.

There are various mechanisms that the coordinator can use to determine when the processes are able to use the new key. The coordinator process can, for example, utilize a timeout (for example, 100 ms after the signalling of collection phase). Alternatively, for example, the coordinator process can monitor changes in the dedicated shared memory for key establishment 105 and wait until after each process has written its nonce.

Next, the coordinator can signal (440) the beginning of "working phase" by, for example, providing a particular value of the control word as input to the platform-provided hiding function and writing it to the control word 125 in the dedicated shared memory for key establishment 105. Working phase denotes the interval of system operation in which processes communicate with each other by encrypting/writing and reading/decrypting data from shared access memory 110 using a composite key generated from the nonces written during the collection phase.

Each process can now retrieve (450) each of the nonces stored by the other processes. Each process can do this by, for example, reading the data from the locations in the dedicated shared memory for key establishment 105 to which they were written, and retrieving the nonces using the platform-provided revealing function.

Having received all the nonces from the peer processes, each process can now utilize each of the nonces as input to a key deriving function to generate (460) a new composite key. By utilizing each of the nonces, it is ensured that the resulting composite key depends on all of them (in essence combining/pinning them together).

The key deriving function can be, for example, a function that takes an arbitrary number of inputs to produce a fixed length output. In some embodiments of the presently disclosed subject matter, the key deriving function can be a cryptographic hash function such as Advanced Encryption Standard-Cipher-based Message Authentication Code (AES-CMAC).

Alternatively, for example, the key deriving function can utilize sampling. In this case, the key deriving function conducts several iterations, where in each iteration specific bits are selected from each of the nonces so that the output value includes some bits from each nonce. As a more specific example: a key deriving function operating on 3 notices can determine the n-th bit of the output according to the corresponding bit in the (n/3)-th nonce—so that the composite key will have every $3^{rd}$ bit taken from the first nonce and the output key will contain some bits from every supplied nonce.

In some embodiments of the presently disclosed subject matter, different key deriving functions can be used at different times.

Following the composite key generation, each process can now use the composite key. Specifically: a process that writes to shared data memory 110 can encrypt (470) using the new composite key before writing, and a process that reads from shared data memory 110 can use the new composite key to decrypt (470) data that has been read.

A process which reads data from the shared data memory 110 can verify (480) that data that was read maintains integrity (i.e. was not corrupted or maliciously modified) and was successfully decrypted. By way of non-limiting example, processes which decrypt encryption schemes such as XTS-AES can detect whether a decryption fails to produce the correct decrypted data (for example, in a case where the decryption key is incorrect) or where data integrity has been lost (for example, due to data corruption of malicious modification). If the verification is successful, then the process can continue to use (490) the composite key until the next key rollover.

If the verification was unsuccessful, then the process can request (495) from the coordinator to initiate a key rollover and restart a collection phase. If the verification was unsuccessful (i.e. data did not correct decrypt), this can be the result of a benign error or the result of disruption by a malicious entity. A malicious entity (such as malware running in a module outside of the containers) could, for example, attempt to write bad information into the dedicated shared memory for key establishment 105. More specifically, a malicious entity could have attempted to write old data ("replay attack") into the memory in an attempt to cause generation of incorrect key data. The disclosed method can, for example, detect such attacks and request to perform a composite key generation once again.

For added security and protection from side channel and other attacks, the coordinator can limit, change, initiate or alter these key rollover requests.

It is noted that in the case of successful verification, each process is now in possession of a newly generated composite key that is suitable for use as a symmetric encryption/decryption key for communication (via shared data memory 110) among all processes which contributed nonces. Since each process contributed its own nonce, each process is guaranteed that the key is actually new and uncompromised. Furthermore, since the platform-provided secrecy functions required (by all processes) to establish the composite key is (for example: by hardware design) only available to processes on the same platform signed by the same signing authority, each process is guaranteed that its communication peers are authentic, trusted, and have not been not tampered with.

It is further noted that the establishment of the secured communication mechanism described herein effectively enables a logically separate subsystem that is shielded from access by entrusted parts of the system, and that such a shielded subsystem can be used, for example, to provide a computer system enabling peripherals to be used in access of remote systems in a manner that is resistant to keyloggers, sidechannel attacks etc.

It is noted that in some embodiments of the present subject matter, the method for establishment of the composite key described herein does not require the use of public-key cryptography or presharing of a shared secret key among the communicating parties.

FIG. 4 describes a method of composite key establishment in which each process reads nonces and calculates the composite key independently. It will be clear to one skilled in the art that the method can include variations that do not affect the basic operation of the method. For example, a single process could compute the composite key from the nonces and then distribute the composite key to the processes using the platform-derived secrecy functions.

Alternatively, for example, each process can calculate part of the composite key, combining a received partial value with its own nonce, then passing the combined value to a next process—using the platform-derived secrecy functions—until all processes have participated in the calculation. In this manner each process can contribute its nonce to the composite key without exposing its nonce.

It is noted that the teachings of the presently disclosed subject matter are not bound by the flow chart illustrated in FIG. 4, and that the illustrated operations can occur out of the illustrated order. For example, operations 450 and 460, shown in succession, can be executed substantially concurrently, or in the reverse order. It is also noted that whilst the flow chart is described with reference to elements of FIG. 1, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of securely sharing data, by a first process, with one, two, or more peer processes, wherein each of the first process and the peer processes execute in a respective secure enclave comprised in a first secure enclave group of a secure enclave infrastructure executing on a processing and memory circuitry (PMC), the method comprising:
   a) generating a nonce;
   b) obtaining respective encrypted nonces from each of the one, two, or more peer processes;
   c) applying a platform-provided revealing function to each of the obtained encrypted nonces, thereby resulting in retrieved respective nonces;
      wherein the platform-provided revealing function decrypts the respective encrypted nonce in accordance with a PMC-maintained decryption key,
      wherein the PMC is configured to permit utilization of the PMC-maintained decryption key only in service of a process executing within a secure enclave signed by a key of a first signing authority, and
      wherein the first process requests utilization of the PMC-maintained decryption key, and executes in a secure enclave signed by a provider key;
   d) utilizing a key generation function to derive a group key from, at least, the generated nonce and the retrieved nonces; and
   e) successfully decrypting, using the derived group key, an encrypted data unit written by a process of the one or more peer processes to a shared access memory (SAM), the first process thereby ensuring that each peer is: executing on the PMC, executing in a secure enclave that is authorized by secure enclave infrastructure, and executing authentic software.

2. The method of claim 1, wherein steps a) is through e) are further performed by each of the one, two, or more peer processes.

3. The method of claim 1, wherein the first process writes to the SAM, and obtains the respective encrypted nonces by reading from the SAM.

4. The method of claim 1, wherein the key generation function is a cryptographic hash function.

5. The method of claim 1, wherein the key generation function is a sampling function.

6. The method of claim 1, wherein the first process, responsive to detection of a frequency of group key rollover initiation by a second process of the one or more peer processes meeting a group key rollover threshold, excludes the respective nonce of the second process from the group key derivation.

7. A processing and memory circuitry (PMC) configured to execute a first process and one or more peer processes, wherein the PMC is configured to execute: each of the first process and the processes in a respective secure enclave in a first secure enclave group of a secure enclave infrastructure, and wherein the first process is configured to:
   a) generate a nonce;
   b) obtain respective encrypted nonces from each of the one, two, or more peer processes;
   c) apply a platform-provided revealing function to each of the obtained encrypted nonces, thereby resulting in retrieved respective nonces,
      wherein the platform-provided revealing function decrypts the respective encrypted nonce in accordance with a PMC-maintained decryption key,
      wherein the PMC is configured to permit utilization of the PMC-maintained decryption key only in service of a process executing within a secure enclave signed by a key of a first signing authority, and
      wherein the first process requests utilization of the PMC-maintained decryption key, and executes in a secure enclave signed by a provider key;
   d) utilize a key generation function to derive a group key from, at least, the generated nonce and the retrieved nonces; and
   e) successfully decrypt, using the derived group key, an encrypted data unit written by a process of the one or more peer processes to a shared access memory (SAM), the first process thereby ensuring that each peer is: executing on the PMC, executing in a secure enclave that is authorized by secure enclave infrastructure, and executing authentic software.

8. A computer program product comprising a non-transitory computer readable storage medium containing program instructions, which programs instructions when read by processing and memory circuitry (PMC), causes the PMC to perform a method of securely sharing data, by a first process, with one or more peer processes, wherein each of the first process and the peer processes execute in a respective secure enclave comprised in a first secure enclave group of a secure enclave infrastructure executing on a processing and memory circuitry (PMC), the method comprising:
   a) generating a nonce;
   b) obtaining respective encrypted nonces from each of the one, two, or more peer processes;
   c) applying a platform-provided revealing function to each of the obtained encrypted nonces, thereby resulting in retrieved respective nonces,
      wherein the platform-provided revealing function decrypts the respective encrypted nonce in accordance with a PMC-maintained decryption key,
      wherein the PMC is configured to permit utilization of the PMC-maintained decryption key only in service of a process executing within a secure enclave signed by a key of a first signing authority, and
      wherein the first process requests utilization of the PMC-maintained decryption key, and executes in a secure enclave signed by a provider key;
   d) utilizing a key generation function to derive a group key from, at least, the generated nonce and the retrieved nonces; and
   e) successfully decrypting, using the derived group key, an encrypted data unit written by a process of the one or more peer processes to a shared access memory (SAM), the first process ensuring that each peer process is executing on the PMC, executing in a secure enclave that is authorized by secure enclave infrastructure, and executing authentic software.

* * * * *